Jan. 18, 1966  M. RATTNER  3,229,615
APPARATUS FOR PREPARING CORED FOOD PRODUCTS
Filed Nov. 26, 1963  2 Sheets-Sheet 2
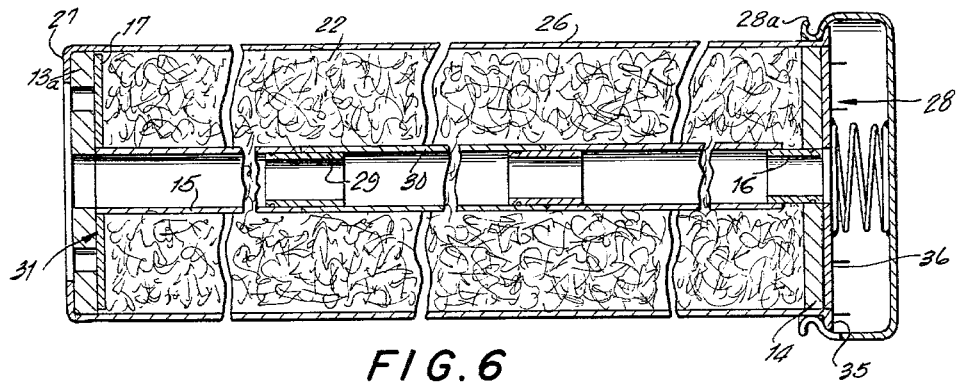
FIG.6
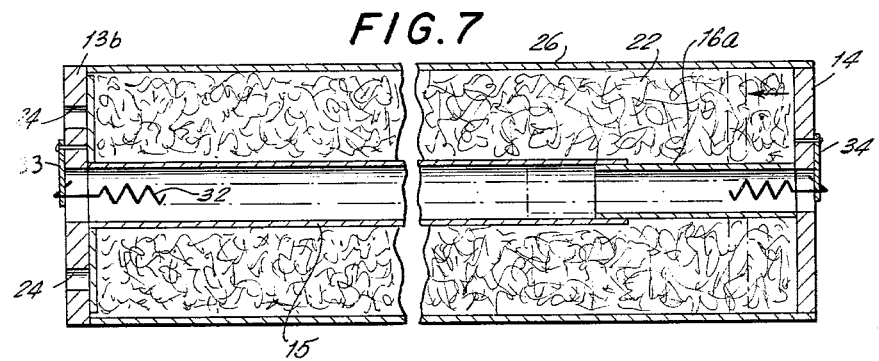
FIG.7
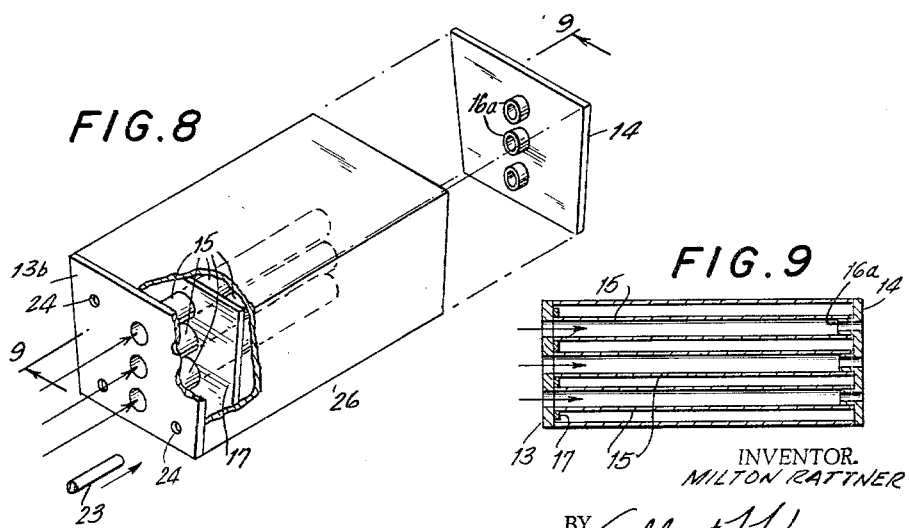
FIG.8
FIG.9
INVENTOR.
MILTON RATTNER
BY Albert F. Kronman
ATTORNEY United States Patent Office
3,229,615
Patented Jan. 18, 1966

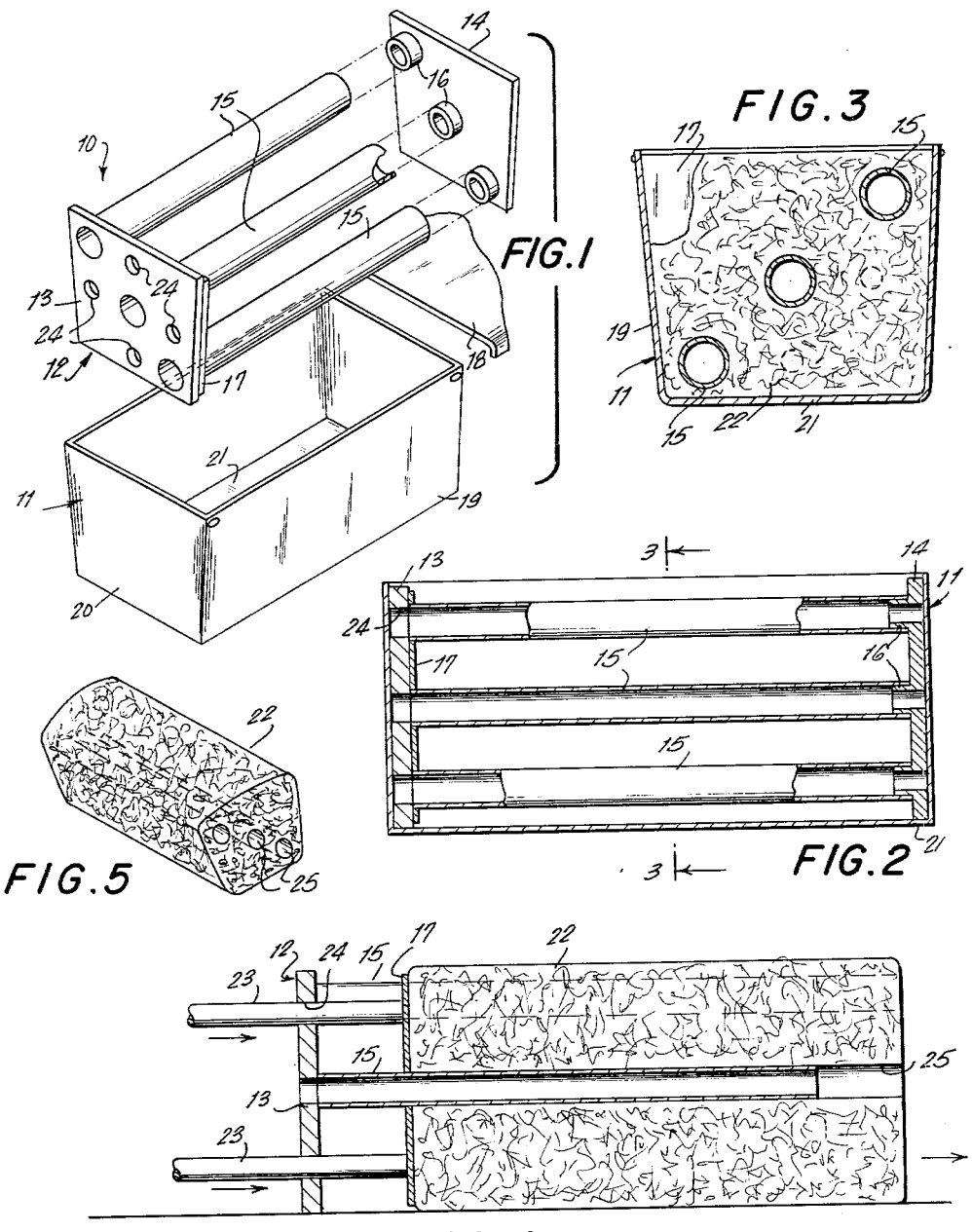

3,229,615
APPARATUS FOR PREPARING CORED
FOOD PRODUCTS
Milton Rattner, 277 Greenwich St., New York 7, N.Y.
Filed Nov. 26, 1963, Ser. No. 325,883
10 Claims. (Cl. 99—351)

This invention relates to an apparatus for preparing food products and specifically to food products in the nature of meat loaves having incorporated therein one or more comestibles.

Food products in the nature of meat loaves having other food stuffs therein, have been prepared from time to time for human consumption. Such products, however, have not been successful commercially due to the high cost of manufacture and the limitations imposed upon the products due to the nature of the preparation of the foods. Meat loaves, for example, must be cooked at a relatively high temperature for a sustained period of time and other foods incorporated within a meat loaf must normally be able to withstand such temperatures. In some instances the meat loaf has been cooked first and thereafter other food stuffs placed within the meat loaf by means of successive layers of meat and other foods which are thereafter held together by means of some form of binder. In still other methods a core was disposed within the meat product which was subsequently pulled from the cooked meat leaving a hollow opening which could be filled with other foods. However, products of the latter type often destroyed the meat loaf product as the core was being withdrawn and provided problems in alignment to ensure that the core would remain disposed in the proper position during the cooking operation. In addition, during cooking there is a shrinkage of the meat which is not compensated for by previously known devices and methods.

Accordingly it is an object of the present invention to provide a device for processing a food product in the nature of a meat loaf combined with other food ingredients carried therein.

Another object of the present invention is to provide a combined meat and other food products which will be ornamental in appearance.

Another object of the present invention is to provide apparatus for cooking a meat loaf and providing transverse openings therein to receive other food products.

Another object of the present invention is to provide a meat loaf cooking apparatus which will shorten the time necessary for cooking the meat loaf while at the same time providing elongated openings therein to receive other food products.

Another object of the present invention is to provide a meat loaf cooking apparatus which will keep the final product compressed so that it can be withdrawn from the transverse cores within the apparatus without destruction of the cooked meat product.

Another object of the present invention is to provide apparatus for cooking cored meat loaf products which will lend itself to easy handling and removing of the cooked meat loaf.

A feature of the present invention is its use of elongated cores supported at each end to provide openings in the cooked meat loaf for the reception of other food materials.

Another feature of the present invention is its use of a sliding plate for removing the cooked meat product from the cores without damage to the said meat product.

Another feature of the present invention is its use of transverse openings in the meat product cooking device whereby heat can reach the center of the meat loaf to shorten the cooking time.

Another feature of the present invention is its use of telescopic core members whereby the length of the meat loaf can be adjusted during cooking to keep the product compressed and to produce a unified meat loaf.

Another feature of the present invention is its use of spring means to maintain a constant pressure on the meat loaf during cooking.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts and in which:

FIGURE 1 is a somewhat exploded view showing one complete embodiment of a meat loaf cooking device according to the present invention.

FIGURE 2 is a longitudinal section of the embodiment shown in FIGURE 1, in the assembled position.

FIGURE 3 is a cross-sectional view taken on line 3—3 of FIGURE 2 looking in the direction of the arrows with the meat in position for cooking.

FIGURE 4 is a longitudinal section similar to FIGURE 2 showing the removal of the meat loaf from the cooking apparatus.

FIGURE 5 is a somewhat isometric view of a complete meat loaf prepared by the use of the apparatus shown in FIGURES 1–4, with certain interior features illustrated by dashed lines.

FIGURE 6 is a view in longitudinal section of another embodiment of the present invention showing the manner in which various lengths of meat loaf can be held by use of a novel interlocking core structure.

FIGURE 7 is a view in longitudinal section of still another embodiment of the present invention showing the manner in which shrinkage of the meat loaf during cooking can be compensated for.

FIGURE 8 is a somewhat exploded view showing the manner in which the meat loaf can be removed from the cooking apparatus in accordance with the present invention.

FIGURE 9 is a view in longitudinal section of still another embodiment of the present invention illustrating the manner in which heat or hot water can circulate through the cores to shorten the cooking time.

Referring to the drawings and specifically to FIGURES 1, 2 and 3; 10 indicates a food processing device consisting of a container or can 11 to receive a core assembly 12. The core assembly 12 is made up of spaced end supports 13, 14, and elongated tubes 15. The tubes 15 are secured at one end to one of the end supports 13 and are received by hollow sleeves 16 attached to the opposite end support 14. Any number of tubes 15 may be incorporated into the core assembly and their arrangement such as to provide an ornamental disposition within the finished article as hereinafter more fully described.

A plate 17 is slidably received upon the tubes 15 and is placed adjacent the end support 13 as shown in FIGURE 1 at the outset of the food processing operation. With the sliding plate 17 in place the end support 14 is coupled to the tubes 15 by means of the sleeves 16 to form a core assembly in which the elongated tubes 15 are supported at each end in definite spaced relationship.

A cover 18 which is slidably received upon the container or can 11 completes the assembly of the food processing device shown in FIGURES 1, 2 and 3. The cover 18 together with the walls 19, 20 and bottom 21 of the container or can 11, completely enclose the contents of the container during the cooking operation.

When it is desired to use the food processing device shown in FIGURES 1 through 3, the core assembly 12 is placed within the container 11 and ground meat forced into the said container until it completely fills the container and surrounds the core assembly 12. Thereafter, the cover 18 is slipped into place and the food processing device subjected to heat in the form of boiling water or a heated oven. After the meat has been cooked a sufficient period of time, the cover 18 is slid off the container 11 and the cooked meat 22 together with the core assembly 12 is removed from the container. The end support 14 is next slipped off the ends of the elongated tubes 15 exposing the end of the cooked meat loaf adjacent thereto.

In order to remove the meat loaf from the remainder of the core assembly, the sliding plate 17 is pushed away from the end support 13 thereby forcing the meat loaf off the elongated tubes 15 without damage to the cooked meat product. The sliding plate 17 may be moved away from the end support 13 by the interposition of a flat blade-like member (not shown) or by forcing rods 23 (best shown in FIGURE 4) through openings 24 in the end support 13 which may be provided for this purpose. Since the sliding plate 17 is supported upon the elongated tubes 15 it will force the cooked meat product forward evenly and without crumbling or damaging the said meat product.

The finished meat product is in the form of a loaf, best shown in FIGURE 5, having a plurality of elongated openings 25 therein. The openings 25 may then be filled with cheese, relishes, condiments or other food products. It will be observed that the disposition of the tubular members 15 within the core assembly 12 may be varied to provide a wide variety of ornamental effects in the finished product. It is therefore within the purview of the present invention to use a plurality of tubular members and to vary the cross-sectional shape of the tubular members for the purpose of providing these ornamental effects.

Referring to FIGURE 6 there is shown another embodiment of the present invention in which the container or can 26 is of an elongated rectangular cross-section shape commonly known in the meat industry as a Pullman can. Such cans are closed at each end by a cover member 27, 28, which retain the food within the can during cooking. In order to provide for a wide variety of can sizes this embodiment employs one or more bushings 29, which are press fitted into tubing 30 and enable additional lengths of tubing 30 to be added to the elongated tubes 15, hereinabove described in connection with FIGURES 1–4. This embodiment of the invention also uses a sliding plate 17, by means of which the cooked meat product is forced out of the container 26, and off the core assembly 30. In using the processing device shown in FIGURE 6 the end support 13 is placed within the container 26 together with the sliding plate 17 and the additional lengths of tubing 30, necessary to reach to the opposite end of the container 26 and be engaged by the sleeves 16 on the opposite end support 14. An inwardly disposed flange 27 on the open end of the container 26 retains the end support 13. Thereafter the second end support 14 is slipped into place followed by the cover 28. The cover 28 engages an outwardly extending flange 35 on the container 26 by means of integral spring fingers 28a which hold the cover in place. A spring loaded pressure plate 36 carried by the cover 28 bears against the end support 14 to compress the meat during cooking. The entire assembly may then be placed in an oven or boiling water for cooking purposes. Heat can enter the tubing 30 through the openings in the end support 13a to shorten cooking time.

In removing the food product from the container 26 the cover 28 is first removed, the end support 14 pulled off the elongated tube 30, and the remainder of the core assembly 31 pushed out of the container 26. Alternately, the end support 13a may be held within the container 26 and the sliding plate 17 pushed through the container by means of rods 23 until the meat product is completely ejected from within the container. Damage to the meat product is further lessened by this process since the meat is supported by the walls of the container during much of the ejecting step.

It is within the purview of the present invention to provide openings in both end supports 13, 14, in register with the elongated tubes 15, 30, so that boiling water or heat may traverse the meat within the container to reduce the amount of time necessary for cooking. This construction is illustrated in FIGURES 7, 8 and 9, and is applicable to the embodiments shown in FIGURES 1–6. In the embodiments of FIGURES 1–6, it is possible to utilize the end supports 13, 13a, 14, as the end walls for the containers or cans in order to provide the free passage of heat through the core assembly.

Referring to FIGURE 7 there is shown a further embodiment of the present invention in which the end support 13b forms one end of the container and the opposite end support 14 is pressed firmly against the meat 22 within the container 26 by means of an elongated spring 32 secured at each end to the end supports 14, 15, by small arms 33, 34. In this form of the invention the end supports 13b, 14, are substituted for the cover members 27, 28, illustrated in FIGURE 6. Since there is a certain amount of shrinkage of the meat during cooking the spring 32 serves to compress the meat between the end supports 13b, 14. It will be seen that the end support 13b overlies one end of the container 26 whereas the end support 14 is slidable within the said container. It will also be seen that the hollow sleeves 16a of this form of the invention are elongated and able to slide within the tubes 15 to compensate for the change in length. With the covers 27, 28, removed the boiling water or heat is free to pass through the tubes of the core assembly to expedite the cooking period.

Once the cooking process has been finished the meat can be forced out of the container 26 by either holding the sliding plates 17 stationary within the container 26 and pulling the end support 13b and the elongated tubes out of the meat or by holding the end plate 13b in its position on the end of the container 26 and pushing the meat out of the container by means of rods in a manner hereinabove set forth. By compressing the meat within the container during the cooking operation a more compact durable meat product is achieved which will lend itself to subsequent filling and handling without destruction and consequent rejection as a food product.

From the foregoing it will be seen that there has been provided an apparatus for forming food products with speed and having transverse bores therein for the reception of food which are accurately spaced and ornamently disposed within the meat loaf.

Having thus fully described the invention, what is claimed as new and desired to be secured by Letters Patent of the United States, is:

1. A device for preparing transversely cored meat loaves comprising a container to receive uncooked meat and a core assembly within the container, said core assembly comprising a first end support, a plurality of elongated tubular members secured at one end to the first end support, a second end support to receive the free ends of the tubular members, means to removably couple the tubular members to the second end support and a plate slidably carried by the tubular members and disposed in a plane substantially normal to the longitudinal axis of the tubular members.

2. A device according to claim 1 in which the tube coupling means consists of sleeves secured to the second end support.

3. A device according to claim 1 in which the first end support is provided with openings to give access to the plate and a cover member to confine the meat product during cooking.

4. A device according to claim 1 in which the first and second end plates constitute walls of the container and are provided with openings in communication with the interior of the tubular members.

5. A device according to claim 1 in which the container is elongated and the tubular members consist of a plurality of sections held together by internal bushings.

6. A device for preparing transversely cored meat loaves comprising an elongated container, open at each end to receive uncooked meat, a core assembly within the container comprising a first end support, a plurality of elongated tubular members secured at one end of the first end support, a second end support to receive the free ends of the tubular members, and means to removably couple the tubular members to the second end support.

7. A device for preparing transversely cored meat loaves, comprising an elongated container, open at each end to receive uncooked meat, a core assembly within the container comprising a first end support, a plurality of elongated tubular members secured at one end to the first end support, a second end support to receive the free ends of the tubular members, means to removably couple the tubular members to the second end support and cover means for at least one end of the container to retain the meat during cooking.

8. A device according to claim 6 in which the tubular members are hollow and communicate through openings in the end supports with the exterior of the device.

9. A device according to claim 6 in which the coupling means consist of elongated sleeves telescopically received within the tubes.

10. A device according to claim 6 in which the coupling means consist of elongated sleeves telescopically received within the tubes and the end supports are urged together by at least one spring carried within the tubular members and secured at each end to an end support.

References Cited by the Examiner

UNITED STATES PATENTS

| 345,316 | 7/1886 | Ortman | 99—351 |
|---|---|---|---|
| 1,106,042 | 8/1914 | Gumm | 249—151 |
| 1,408,685 | 3/1922 | Benson | 249—175 X |
| 1,696,343 | 12/1928 | Burdick | 107—54.28 |
| 1,710,369 | 4/1929 | Martin | 249—142 X |
| 2,252,990 | 8/1941 | Smith | 249—151 |
| 2,937,092 | 5/1960 | Zitin | 99—108 X |
| 2,937,095 | 5/1960 | Zitin | 99—108 X |
| 2,956,600 | 10/1960 | McDonald | 146—52 |
| 3,059,680 | 10/1962 | Ridean | 146—52 |

FOREIGN PATENTS

| 517,139 | 1/1940 | Great Britain. |
|---|---|---|
| 259,768 | 7/1949 | Switzerland. |

WALTER A. SCHEEL, *Primary Examiner.*

H. LORD, *Examiner.*